(12) United States Patent
Nachtmann et al.

(10) Patent No.: US 10,036,430 B2
(45) Date of Patent: Jul. 31, 2018

(54) CLUTCH DEVICE

(71) Applicant: Schaeffler Technologies AG & Co. KG, Herzogenaurach (DE)

(72) Inventors: Florian Nachtmann, Strassburg (FR); Felix Vogel, Sinzheim (DE); Willi Ruder, Lahr (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 362 days.

(21) Appl. No.: 14/651,961

(22) PCT Filed: Dec. 10, 2013

(86) PCT No.: PCT/DE2013/200345
§ 371 (c)(1),
(2) Date: Jun. 12, 2015

(87) PCT Pub. No.: WO2014/090249
PCT Pub. Date: Jun. 19, 2014

(65) Prior Publication Data
US 2015/0330460 A1     Nov. 19, 2015

(30) Foreign Application Priority Data
Dec. 13, 2012   (DE) .................. 10 2012 222 998

(51) Int. Cl.
*F16D 13/75*   (2006.01)
*F16D 28/00*   (2006.01)
*F16D 23/12*   (2006.01)

(52) U.S. Cl.
CPC ........... *F16D 13/757* (2013.01); *F16D 28/00* (2013.01); *F16D 2023/123* (2013.01)

(58) Field of Classification Search
CPC .................................................... F16D 13/757
See application file for complete search history.

(56) References Cited

U.S. PATENT DOCUMENTS

| | | | | |
|---|---|---|---|---|
| 6,050,381 A | * | 4/2000 | Uehara | F16D 13/385 192/111.2 |
| 6,123,180 A | * | 9/2000 | Weidinger | F16D 13/585 192/111.3 |
| 6,193,039 B1 | | 2/2001 | Doremus et al. | |

(Continued)

FOREIGN PATENT DOCUMENTS

| | | |
|---|---|---|
| CN | 102203447 | 9/2011 |
| CN | 102434595 | 5/2012 |

(Continued)

*Primary Examiner* — Robert W Hodge
*Assistant Examiner* — Ryan P Dodd
(74) *Attorney, Agent, or Firm* — Kevin L. Parks

(57) ABSTRACT

A clutch device comprising a counterplate, a pressure plate displaceable to a limited extent in an axial direction to frictionally clamp a clutch disc between the pressure plate and the counterplate, a lever element acting on the pressure plate to displace the pressure plate in an axial direction, a central flange at least partially disposed between the pressure plate and the lever element and having at least one opening for the pressure plate and/or the lever element to pass through, and a wear compensation device for automatically adapting to clutch wear, wherein to prevent any undesired wear compensation, the lever element is engageable with the central flange.

11 Claims, 2 Drawing Sheets

(56) References Cited

U.S. PATENT DOCUMENTS

| | | | | |
|---|---|---|---|---|
| 6,264,019 | B1 * | 7/2001 | Uehara | F16D 13/757 |
| | | | | 192/111.19 |
| 8,245,829 | B2 * | 8/2012 | Jayaram | F16D 13/757 |
| | | | | 188/196 V |
| 8,733,525 | B2 | 5/2014 | Raber et al. | |
| 9,108,637 | B2 * | 8/2015 | Ruder | B60K 6/383 |
| 2014/0094341 | A1 * | 4/2014 | Ruder | B60K 6/383 |
| | | | | 477/5 |

FOREIGN PATENT DOCUMENTS

| | | | |
|---|---|---|---|
| CN | 102562848 | | 7/2012 |
| DE | 102011085836 A1 | | 5/2012 |
| DE | 102012203468 A1 | | 10/2012 |
| DE | WO2012167767 | * | 12/2012 |
| DE | WO2013/007232 | * | 1/2013 |
| FR | 2765288 A1 | | 12/1998 |
| WO | 2012159598 A1 | | 11/2012 |
| WO | 2014063697 A1 | | 5/2014 |

* cited by examiner

CLUTCH DEVICE

CROSS-REFERENCE TO RELATED APPLICATIONS

The present application is the U.S. National Stage Application pursuant to 35 U.S.C. § 371 of International Patent Application No. PCT/DE2013/200345, filed on Dec. 10, 2013, which application claims priority from German Patent Application No. DE 10 2012 222 998.1, filed on Dec. 13, 2012, which applications are incorporated by reference in their entireties.

TECHNICAL FIELD

The present invention relates generally to a clutch device, in particular, to a drive clutch for an internal combustion engine of a hybrid vehicle.

BACKGROUND

German Patent Application No. DE 10 2011 102 222.1, discloses a clutch device embodied as a drive clutch for an internal combustion engine of a hybrid vehicle. The clutch device comprises a counterplate, a pressure plate that is axially displaceable to a limited extent to frictionally clamp a clutch disc between the pressure plate and the counterplate, a lever element acting on the pressure plate to displace the pressure plate in an axial direction, and an actuating device. The actuating device has a stator device, a rotor device capable of rotating relative to the stator device, and a slide device that is displaceable to a limited extent in an axial direction relative to the rotor device to exert pulling and pushing forces. A rolling body screw drive that includes a plurality of coils and a rolling body revolution track with rolling bodies running in a rolling body channel is provided between the rotor device and the slide device. The rolling body channel has a track changing region that is embodied in such a way that before the track changing region as viewed in the circumferential direction, rolling bodies run between a first coil and a second coil, and behind the track changing region as viewed in the circumferential direction, rolling bodies run between the second coil and a third coil.

SUMMARY

According to aspects illustrated herein, there is provided a clutch device, in particular a drive clutch for an internal combustion engine of a hybrid vehicle including a counterplate; a pressure plate displaceable in an axial direction to frictionally clamp a clutch disc between the pressure plate and the counterplate; a lever element operatively arranged to displace the pressure plate in an axial direction; a central flange at least partially disposed between the pressure plate and the lever element and having at least one opening for the pressure plate or the lever element to pass through; and, a wear compensation device for automatically compensating for clutch wear. To prevent any undesired wear compensation, the lever element is engageable with the central flange.

According to aspects illustrated herein, there is provided a clutch device, in particular a drive clutch for an internal combustion engine of a hybrid vehicle including a counterplate; a pressure plate displaceable in an axial direction to frictionally clamp a clutch disc between the pressure plate and the counterplate; a lever element operatively arranged to displace the pressure plate in an axial direction; a central flange at least partially disposed between the pressure plate and the lever element and having at least one opening for the pressure plate and the lever element to pass through; and, a wear compensation device for automatically compensating for clutch wear. To prevent any undesired wear compensation, the lever element is engageable with the central flange.

An object of the present invention is to provide a clutch device that has a long useful life and is in particular suitable as a drive clutch for an internal combustion engine of a hybrid vehicle.

A clutch device of the invention comprises a counterplate, a pressure plate that is displaceable in an axial direction to a limited extent to frictionally clamp a clutch disc between the pressure plate and the counterplate, a lever element acting on the pressure plate to displace the pressure plate in an axial direction, a central flange at least partly disposed between the pressure plate and the lever plate and including at least one option of being passed through by the pressure plate and/or the lever element, and a wear compensation device for an automatic adaptation to clutch wear, wherein the lever element is engageable with the central flange to prevent an undesired adaptation to clutch wear. The clutch is in particular designed as a drive clutch for an internal combustion engine of a hybrid vehicle.

Since friction linings of the clutch disc and, to a more limited extent, friction faces of the counterplate and of the pressure plate are subject to wear due to the frictional engagement, the pressure plate continuously needs to be moved closer to the counterplate over the useful life of the clutch device to compensate for a thinning of the friction linings and the friction faces in an axial direction and to be able to establish frictional engagement and an engagement of the clutch device. For this purpose, the clutch device is equipped with a wear compensation device for an automated adaptation to clutch wear. The wear compensation device is preferably embodied as a force-based wear compensation device. To prevent undesired adaptation to wear in an automated wear compensation device, which may for instance occur due to additional travel or axial vibration of the pressure plate, the lever element is engageable with the central flange. In force-based wear compensation devices in particular, this prevents the second control point to be passed through.

In accordance with a preferred aspect, the lever element is essentially annular. The lever element further includes fingers disposed radially on the inside and engageable with the central flange. This allows the clutch device to be of particularly compact design because the engagement may thus occur on a particularly small radius.

In accordance with a further preferred exemplary embodiment, the clutch device includes an actuating device with a stator device, a rotor device arranged for rotation relative to the stator device, and a slide device that is movable to a limited extent in an axial direction relative to the rotor device and exerts pulling and pushing forces and is in operative connection with a pull and push device exerting pulling and pushing forces on the lever element. Thus, it is possible to apply both pulling and pushing forces to the lever element. For instance, the clutch device may be disengaged by pushing forces, whereas the torque capacity of the clutch device may be temporarily increased by pulling forces in that the force level of the pressure plate is increased, causing the clutch disc to be clamped more tightly between the pressure plate and the counterplate. Thus, on the whole, the clutch device may be dimensioned for a lower torque during normal operation because torque peaks may be accommodated by the aforementioned pull and push device.

In accordance with an advantageous further feature, the actuating device may be supported for rotation on the central flange. In the region of the bearing, preferably in the region of a central bearing, the central flange has an axially protruding section with which the lever element is engageable. This allows the clutch to be of particularly compact design.

In accordance with a preferred further exemplary embodiment, the pull and push device has at least one recess through which the lever element is engageable with the central flange. In this way, any undesired wear compensation may be prevented in a particularly reliable way despite the compact design of the clutch device.

In accordance with a preferred further feature, the pull and push device includes at least one pull element and at least one push element between which the lever element is receivable and which are connectable to each other. This is a way to simplify assembly of the clutch device despite the compact design of the clutch device.

The lever element preferably has a catch spring characteristic. For instance, in the disengaged condition of the clutch, the lever element passes through a negative force region, lowering the disengaging force. To initiate the engagement process and to leave the region of negative force, the lever element may be acted upon by the pull element, i.e., it is pulled.

In accordance with a preferred further exemplary embodiment, the pull element has at least one recess through which the lever element is engageable with the central flange. In accordance with a particularly advantageous aspect, the recess may be formed in the region of the free end(s) of the finger(s) of the lever element.

The pull element and the push element are preferably connected in a detachable way, preferably by means of multiple screw-sleeve connections distributed in a circumferential direction. In the context of the present description, "detachable" in particular means "detachable in a non-destructive way". This design allows the actuating device to be easily dismounted and in particular to be disconnected from the rest of the clutch device, for instance when an error has occurred during assembly or when repairs are needed.

In accordance with an advantageous further feature, the pull element may have multiple recesses distributed in the circumferential direction through which the lever element is engageable with the central flange and which are arranged between the screw-sleeve connections. This also allows the clutch device to be of particularly compact design.

In accordance with an advantageous further feature, a rolling body screw drive with at least three coils and with a rolling body revolution track having rolling bodies running in a rolling body channel may be disposed between the rotor device and the slide device, with the rolling body channel having a track changing region designed in such a way that before the track changing region as viewed in the circumferential direction the rolling bodies run between a first coil and a second coil and after the track changing region as viewed in the circumferential direction the rolling bodies run between the second coil and a third coil. This in particular allows equally strong forces to be generated in the pull and push directions.

In addition to the annular rolling body revolution track filled with rolling bodies, the rotor device has a yoke. The yoke of the rotor device is supported for rotation directly or indirectly on the stator device by a support bearing, in particular, a radial bearing.

In accordance with an advantageous further feature, the stator device and the rotor device rotatable relative to the stator device form an electric motor. The electric motor is preferably embodied as a brushless direct current motor or as a three-phase alternating current motor with magnets, or, to be more precise, permanent magnets provided on the rotor side and coils to which alternating current may be supplied disposed on the stator side. In accordance with a preferred exemplary embodiment, the electric motor is embodied as an external rotor motor, i.e., the stator device is disposed inside and surrounded by an annular rotatable rotor device. However, the electric motor may also be embodied as an internal rotor motor.

Power is applicable to the actuating device from a power supply and the actuating device is preferably supported in the drive train of the motor vehicle in such a way that it only needs to be supplied with power to engage or disengage the clutch device. The rolling body screw drive, which is disposed between the rotor device and slide device as viewed in the operating direction, translates a rotary movement of the rotor device into a translator movement of the slide device. The rolling body screw drive is preferably a self-locking drive. The slide device, by means of the separable pull and push device, may exert the pull and push forces on the lever element of the clutch device via a release bearing, which is embodied as an angular ball bearing, for instance, but may also be a tapered roller bearing, cylindrical roller bearing, or journal bearing.

For instance, the stator device may be fixed against relative rotation to a carrier component, in particular, a housing carrier, allowing power to be supplied to the stator device by cables and without a hydraulic rotary joint or inductive coupling. An input shaft of the clutch and the power take-off shaft of the internal combustion engine, respectively, extend radially inside the stator device and inside the carrier component, respectively. The input shaft is supported for rotation relative to the stator device and carrier component, respectively.

However, it is likewise possible for the stator device to be fixed against relative rotation on the input shaft of the clutch, which means that the stator device rotates at the rotary speed of the internal combustion engine. In this case, a hydraulic rotary joint or inductive coupling is required to supply power to the actuating device. Supplying power to the actuating device in one direction causes the rotor device to rotate at a rotary speed that is higher than the input rotary speed of the drive train, causing the clutch to be disengaged. Supplying power to the actuating device in the other direction causes the rotor device to rotate at a rotary speed that is lower than the input rotary speed of the drive train, causing the clutch to be engaged. Thus, the disengagement process of the clutch device may be initiated by an acceleration of the rotor device, whereas the engagement process of the clutch device is initiated by a deceleration of the rotor device. In the same way, it is likewise possible for the disengagement process of the clutch device to be initiated by a deceleration of the rotor device and for the engagement process of the clutch device to be initiated by an acceleration of the rotor device.

In accordance with a preferred exemplary embodiment, the rolling body screw drive has an outer sleeve into which a formed spring having a plurality of coils is inserted. The formed spring is in particular formed of a helically coiled spring wire which, in a preferred embodiment, is contoured, i.e., has an engagement contour on both axial sides, the engagement contour being separated by a ridge disposed therebetween. The adjacent engagement contours of two successive coils of the formed spring reflect part of the surface geometry of the rolling body, allowing the respective rolling body to be guided in an axial direction in a track running in a circumferential direction between two adjacent coils of the formed spring.

To support the formed spring, the outer sleeve is closed by a cover screwed to the outer sleeve by multiple screws distributed in the circumferential direction. A compensation disc is preferably provided between the cover and the outer sleeve. Compensation discs are available in different thicknesses to ensure that the rolling body screw drive is free of play in an axial direction as far as possible during operation of the actuating device on the one hand and that the rolling body screw drive is smooth-running and in particular does not block. Thus, when the actuating device is assembled, a suitable compensation disc needs to be chosen to accurately adjust the axial length of the space in which the helical formed spring is disposed.

The space in which the formed spring is disposed is delimited towards the outside on both axial sides by a respective seal. Each one of the two seals, one of which is on the side of the outer sleeve and the other one of which is on the cover side, is slidably engaged with a respective inner sleeve to allow the translatory movement of the slide device. The space between the two seals is preferably filled with grease, i.e., it is embodied as a grease-filled area, to minimize friction in the rolling body screw drive and to prevent the rolling bodies from being blocked.

In accordance with an advantageous further feature, the second coil may cross the track changing region exclusively in the region of a greater depth of the rolling body channel. The depth of the rolling body channel is to be determined in the radial direction of the actuating device and of the clutch device, respectively. Thus, a blocking of the rolling bodies as they cross the second coil of the formed spring may be reliably avoided.

The rolling bodies are preferably embodied as balls. The rolling body channel is preferably embodied as a revolving ball channel. In a carrying region, the ball channel is preferably essentially U-shaped, with the balls essentially submerged in the ball channel by one half of their diameter as viewed in the radial direction of the actuating device. In accordance with an advantageous further feature, the depth of the track changing region may be essentially equal to or preferably greater than the diameter of the balls. This means that in the track changing region, the balls may be at least almost completely submerged in the ball channel as viewed in the radial direction of the actuating device. The submersion needs to be at least deep enough for the balls to be able to change from the track disposed between the first and second coils as viewed in the axial direction of the actuating device to the track disposed between the second and third coils as viewed in the axial direction without touching the second coil, in particular, the ridge of the formed spring, in the region of the second coil. This needs to be ensured, too, if the slide device tilts during operation of the actuating device, which means that it is advantageous in particular for the balls to be completely submerged in the ball channel in the track changing region, i.e., for the diameter of the balls at the minimum to correspond to the depth of the rack changing region in the radial direction of the actuating device. The diameter is preferably smaller than the depth of the track changing region.

In accordance with a preferred exemplary embodiment, in an electric motor embodied as an external rotor motor, the rolling body revolution track is disposed in the outer circumference of the rotor device, whereas the formed spring between whose coils the rolling bodies run is accordingly disposed radially to the outside and embodied as a formed spring with an inner contour, with both the ridge and the engagement contours for the rolling bodies extending radially inward. Accordingly, the rotor device has the revolving rolling body channel in its outer circumference. However, if the electric motor is an internal rotor motor, it is likewise possible for the revolving rolling body track to be provided in the inner circumference of a rotor device, and accordingly to arrange the formed spring, embodied as a formed spring with an outer contour, radially on the inside. Accordingly, the revolving rolling body channel is provided in the inner circumference of the rotor device.

The clutch device may be a single clutch. Alternatively, the clutch device may be a multiple clutch, in particular, a double clutch. In the case of a double clutch, two actuating devices of the aforementioned type are preferably to be provided. The friction clutch may in particular be embodied as a drive clutch for coupling and uncoupling the internal combustion engine to and from a drive train of a hybrid vehicle, for instance to minimize moments of inertia and friction by uncoupling the internal combustion engine when the vehicle is driven exclusively by the electric motor.

The clutch device may be a dry clutch or a wet clutch. The clutch device may be a clutch that is engaged when it is in a non-actuated condition, i.e., a normally engaged clutch, or a clutch that is disengaged in the non-actuated condition, i.e., a normally disengaged clutch. In the normally-engaged clutch, the lever element that is acted upon by the actuating device is in general embodied as a diaphragm spring, whereas in a normally disengaged clutch, the lever element that is acted upon by the actuating device is in general embodied as a lever spring.

BRIEF DESCRIPTION OF THE DRAWINGS

The present invention will be explained in more detail below based on preferred exemplary embodiments in connection with the associated drawings in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
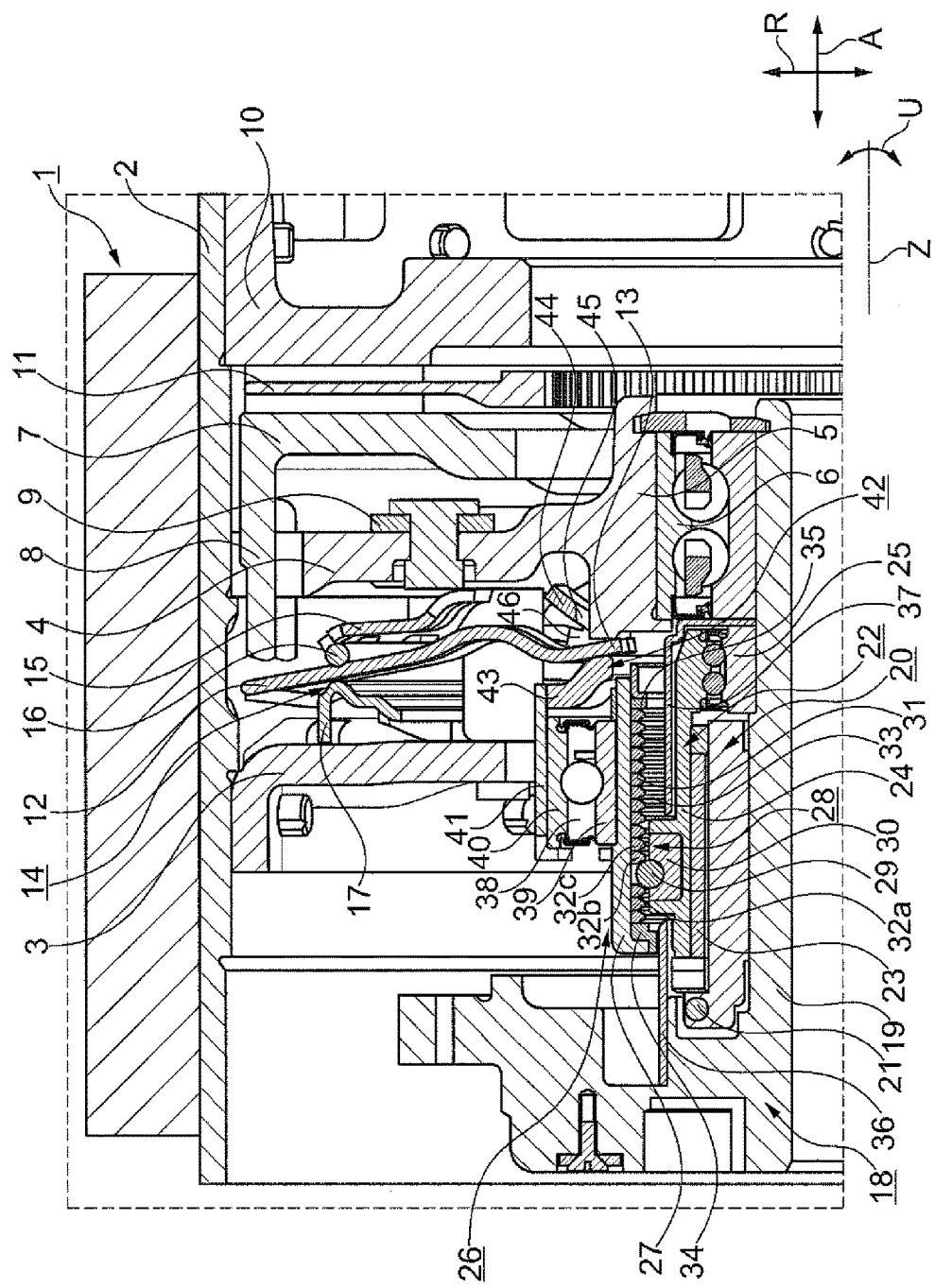
FIG. 1 is a sectional view of an exemplary embodiment of a clutch device including an actuating device with a pull and push device.
Figure 2:
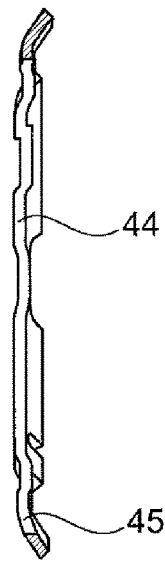
FIG. 2 is a sectional view of a pull element of the pull and push device of FIG. 1; and, FIG. 3 is a semi-elevational view of the pull element shown in FIG. 2.
Figure 3:
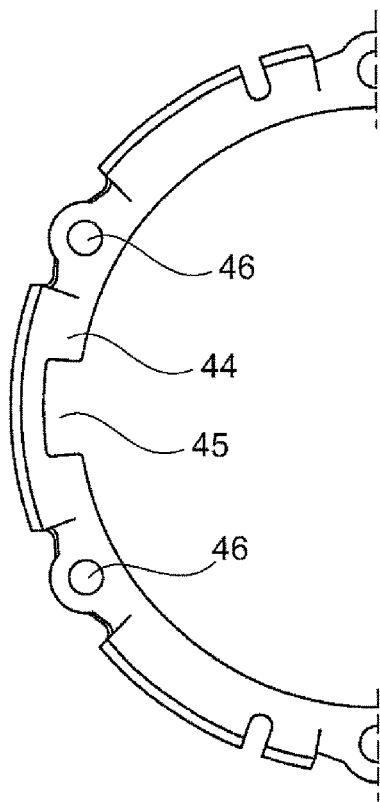

FIGS. 1 through 3 refer to an exemplary embodiment of clutch device 1 with actuating device 18 for a motor vehicle.

In particular, FIGS. 1 through 3 refer to a drive clutch for an internal combustion engine of a hybrid vehicle. Features that are not indicated as essential to the invention in the present description are to be understood to be optional. Thus, the following description also refers to further exemplary embodiments of clutch device 1 that include partial combinations of the features that will be explained below.

Clutch device 1 is supported for rotation about axis of rotation Z and includes at least one pressure plate 7, at least one counterplate 10, and at least one clutch disc 11 disposed between pressure plate 7 and counterplate 10 as viewed in axial direction A of clutch device 1. Counterplate 10 is fixedly connected to housing component 2 of clutch device 1, in particular, screwed or doweled thereto or otherwise interlocked therewith. Counterplate 10 may, however, be an integral part of housing component 2. Pressure plate 7 is supported to be fixed against relative rotation in housing component 2 and is displaceable to a limited extent in axial direction A. In particular, pressure plate 7 is fixed against relative rotation in housing component 2 by means of multiple leaf springs 9 distributed in circumferential direction U of clutch device 1 and is pre-loaded away from counterplate 10.

To transmit torque to pressure plate 7 and to preload pressure plate 7, leaf springs 9 may be fixed to housing component 2 or to counterplate 10. In the illustrated exemplary embodiment, however, leaf springs 9 are preferably arranged on central flange 4 of clutch device 1. In the illustrated exemplary embodiment, central flange 4 is disposed inside housing component 2 on the clutch disc side opposite counterplate 10, i.e., in the vicinity of pressure plate 7. Central flange 4 is fixedly connected to housing component 2, for instance screwed or doweled thereto, or otherwise interlocked therewith, but may likewise be an integral part of housing component 2. In its radially outer region, in the vicinity of an inner wall of housing component 2, central flange 4 has multiple recesses distributed in circumferential direction U for pressure plate tabs 8 to pass through.

Pressure plate tabs 8 are integral parts of pressure plate 7 and extend from the pressure plate side facing away from counterplate 10 in axial direction A of clutch device 1 through the recesses provided in central flange 4 to contact a load ring of lever element 12. Thus, in axial direction A, central flange 4 is disposed between counterplate 10 and lever element 12, to be more precise between a friction surface of pressure plate 7 and lever element 12, with pressure plate tabs 8 of pressure plate 7 passing through central flange 4.

Central bearing 6 is provided to inwardly support central flange 4 for rotation on carrier component 19 in radial direction R of clutch device 1. Central bearing 6 is disposed within protruding portion 5 of central flange 4 to be supported on carrier component 19 to be associated with actuating device 18. Central bearing 6 is preferably embodied as a rolling body bearing, for instance as a single-row or double-row ball bearing, in particular, a double-row angular contact ball bearing; it may, however, likewise be embodied as a cylindrical roller bearing such as a tapered roller bearing or a journal bearing.

Radially outside central bearing 6, central flange 4 is fixedly connected to cover component 3 and spaced apart therefrom for instance by shoulder pins. In its radially outer region, cover component 3 is in turn fixed to housing component 2 or is at least in contact with housing component 2. Cover component 3 separates the torque-transmitting region of clutch device 1 from actuating device 18 in axial direction A. In radial direction R of clutch device 1, lever element 12 essentially extends inside housing component 2 and in axial direction A, lever element 12 essentially extends between cover component 3 and central flange 4. Lever element 12 preferably has recesses for the shoulder pins acting to space apart cover component 3 and central flange 4 to pass through in axial direction A.

For a normally-engaged clutch device 1, shown in FIG. 1, lever element 12 may be embodied as a diaphragm spring. For a normally-disengaged clutch device 1, lever element 12 may be embodied as a lever spring. Lever element 12 is supported on the housing and is actuatable by actuating device 18. For this purpose, lever element 12, which is of an essentially annular shape, has fingers 13 extending radially inward from the load ring of lever element 12. The aforementioned shoulder pins acting to space apart cover component 3 and central flange 4 from each other preferably extend between recesses of fingers 13. To engage and disengage clutch device 1, fingers 13 are operatively connectable to pull and push device 42 of actuating device 18. Pull and push device 42 will be explained in more detail below.

In a normally-engaged clutch device 1, the effective force of lever element 12, embodied as a diaphragm spring, is greater than the counteracting force of leaf springs 9, whereas in a normally-disengaged clutch device, the counteracting force of leaf springs 9 is greater than the effective force of the lever element embodied as a lever spring. Accordingly, actuation of the diaphragm spring of the normally-engaged clutch device 1 by actuating device 18 causes clutch device 1 to be released due to a tilting or snapping back of the diaphragm spring, i.e., pressure plate 7 to be moved off and away from counterplate 10, whereas actuation of the lever spring in a normally-disengaged clutch device by means of the actuating device causes the clutch device to be engaged due to a tilting of the lever spring.

When clutch 1 is engaged, torque is frictionally transmitted to clutch disc 11 from an input side of clutch device 1, for instance from a dual-mass flywheel or an internal combustion engine or an electrical drive motor via the clutch housing and via both counterplate 10 and pressure plate 7, both of which are connected to the clutch housing, in particular, to housing component 2, to be fixed against relative rotation. From clutch disc 11, which is frictionally clamped between counterplate 10 and pressure plate 7, the torque is transmitted to the power take-off side of clutch device 1, for instance to an input shaft of a transmission.

However, in the exemplary embodiment shown in FIG. 1 in particular, which is preferably disposed in a hybrid drive train of a hybrid vehicle, other transmission paths are possible. For instance, clutch device 1 may be embodied as a drive clutch for coupling and uncoupling the internal combustion engine to and from the hybrid drive train. For this purpose, the internal combustion engine or, to be more precise, the drive shaft of the internal combustion engine or the power take-off side of a dual-mass flywheel disposed between the internal combustion engine and clutch device 1, may be connected to clutch disc 11 to transmit torque.

An electric traction motor only rudimentally shown in FIG. 1 is disposed in the outer circumference of clutch device 1 in such a way that a rotor of the electric traction motor is connected to housing component 2 so as to be fixed against relative rotation or is an integral part of housing component 2. The torque of the electric traction motor, which is embodied as an inner rotor motor, thus acts on central flange 4, pressure plate 7, and counterplate 10, even when clutch device 1 is disengaged. When clutch device is being engaged, the torque of the electric traction motor may be used to start up the internal combustion engine. Furthermore, when clutch device 1 is in an engaged condition, the torque of the electric traction motor and of the internal combustion engine may be used to drive the vehicle. In the same way, with clutch 1 in an engaged condition, it is possible for the vehicle to be driven exclusively by the internal combustion engine and for the electric motor to be operated in a generator mode to charge an accumulator.

Since the friction linings of clutch disc 11 and, to a smaller extent, friction surfaces of counterplate 10 and pressure plate 7 are subject to wear due to the frictional engagement, pressure plate 7 needs to be moved closer and closer to counterplate 10 over the useful life of clutch device 1 to compensate for the thinning of friction linings and friction surfaces in an axial direction A and to be able to provide frictional engagement and to engage clutch device 1. For this purpose, in the exemplary embodiment shown in FIG. 1, clutch device 1 has a force-based wear compensation device 14. Wear compensation device 14 has sensor spring 15 directly or indirectly arranged between central flange 4 and lever element 12. Wear compensation device 14 further includes adjustment ring 17 disposed between lever element 12 and cover component 3. Ramps of adjustment ring 17 are slidably disposed on counterramps provided on cover component 3. Furthermore, adjustment ring 17 is pre-loaded in circumferential direction U relative to cover component 3 by at least one drive device, in particular at least one drive spring, in a way for the ramps of adjustment ring 17 to slide up on the counterramps of cover component 3 under the preload of the springs.

When the thickness of the friction linings of clutch disc 11 in particular decreases due to clutch wear, to engage clutch device 1, lever element 12 embodied as a diaphragm spring, via pressure plate tabs 8, urges pressure plate 7 closer to counterplate 10, i.e. towards the right in FIG. 1, to frictionally clamp clutch disc 11 between pressure plate 7 and counterplate 10, i.e. to engage clutch device 1. In this process, lever element 12 needs to rise. As a result, the energy level of lever element 12 increases. When clutch device 1 is being disengaged, the increased energy level of lever element 12 ensures that sensor spring 15 is displaced during the disengagement process when the first control point is passed, i.e. that a condition of wear of the clutch is sensed and, due to the displacement of sensor spring 15, lever element 12 lifts off adjustment ring 17, which is pre-loaded in circumferential direction U. As a result, no clamping forces act on adjustment ring 17, allowing adjustment ring 17 to rotate relative to cover component 3 under the preload of the drive spring. The ramps of adjustment ring 17 slide up on the counterramps of cover component 3 until contact between adjustment ring 17 and lever element 12 is reestablished and adjustment ring 17 is subject to a clamping force, i.e. until the clutch wear is compensated for.

To prevent the second control point from being passed, which would cause undesired wear detection and compensation, lever element 12 is engageable with central flange 4. To be more precise, fingers 13 of lever element 12, in particular, free ends of fingers 13 of lever element 12, are engageable with central flange 4. For this purpose, actuating device 18 is supported for rotation on central flange 4 and section 5 protruding in axial direction A from central flange 4 and formed in the region of central bearing 6 is engageable with lever element 12.

FIG. 1 only illustrates force-based wear compensation device 14. However, it is to be understood that a travel-based wear compensation device may likewise be provided. In a travel-based wear compensation device, the aforementioned stop may likewise prevent any undesired initiation of the wear compensation process in the additional travel of clutch device 1.

In the illustrated exemplary embodiment, sensor spring 15 indirectly acts on lever element 12 inasmuch as wire ring 16 is provided between sensor spring 15 and lever element 12. Wire ring 16 defines a pivot bearing for supporting lever element 12 so as to be capable of tilting to engage and disengage clutch device 1. This pivot bearing may, however, be separate from wear compensation device 14, for instance in that wire ring 16 is supported on the shoulder pins or on central flange 4 or on cover component 3. Wire ring 16 may even be dispensed with entirely, for instance, if support tabs of a suitable design are provided on central flange 4 and/or on cover component 3 to pivot lever element 12.

Actuating device 18 provided in clutch device 1 to act on fingers 13 of lever element 12 includes stator device 20 and rotor device 22 disposed for rotation relative to stator device 20. Stator device 20 may, for instance, be fixed against rotation relative to carrier element 19, in particular, to a housing carrier. Stator device 20 and rotor device 22 preferably form an electric motor, in particular, a brushless direct current motor or a three-phase alternating current motor. For this purpose, stator device 20 has a power supply 21 for generating an alternating electromagnetic field in non-illustrated stator-side coils. For magnetic interaction with the stator-side solenoids, rotor device 22 includes magnets 23, more precisely permanent magnets.

The electric motor is preferably embodied as an external-rotor motor, i.e., stator device 20 is disposed radially inside rotor device 22 as viewed in radial direction R of clutch device 1. However, it is likewise possible for the electric motor to be an internal-rotor motor, i.e., a motor whose stator device 20 is disposed radially outside rotor device 22 as viewed in radial direction R.

Rotor device 22 shown in FIG. 1 has yoke 24 supported on carrier component 19 by support bearing 25 in the vicinity of central bearing 6 on the right-hand side of FIG. 1. Thus, in the illustrated exemplary embodiment, support bearing 25 is disposed on the opposite side of power supply 21 for stator device 20 as viewed in axial direction A of clutch device 1. Support bearing 25 may be directly or indirectly connected to stator device 20. Support bearing 25 is preferably embodied as a rolling body bearing, in particular, as a ball bearing, preferably, as a double ball bearing as shown. However, support bearing 25 may likewise be embodied as a cylindrical roller bearing or a journal bearing.

In addition to stator device 20 and rotor device 22, actuating device 18 includes slide device 26 displaceable to a limited extent in axial direction A relative to rotor device 22 for applying pull and push forces. Slide device 26 is disposed radially outside rotor device 22 as viewed in radial direction R. Slide device 26 includes outer sleeve 27 sealed by a cover (not shown as a separate component) on the side of power supply 21 to stator device 20, i.e., in terms of FIG. 1 on the left. A compensation disc (not illustrated as a separate component) is disposed axially between outer sleeve 27 and the cover to define and set an axial length of an installation space defined by outer sleeve 27 and the cover for formed spring 31 of rolling body screw drive 28, which will be explained in more detail below. The cover is screwed to outer sleeve 27 through the compensation disc by a number of non-illustrated screws arranged in the circumferential direction of clutch device 1.

On both axial sides of slide device 26, seal 34, 35 is provided to seal the space in which formed spring 31 of rolling body screw drive 28 is disposed towards the outside. Seals 34, 35 are, for instance, embodied as annular lip seals made of an elastomeric or rubber-containing material. Radially inwardly, seal 34 is slidably engaged with inner sleeve 36, whereas seal 35 is slidably engaged with inner sleeve 37. Both inner sleeves 36, 37 are directly or indirectly connected to stator device 20 or carrier component 19, in particular, to the housing carrier, and are preferably fixed against relative rotation. Inner sleeves 36, 37, seals 34, 35, the cover, and outer sleeve 27 define grease-filled area 33 in which formed spring 31 of rolling body screw drive 28 is provided.

Release bearing 38 is disposed radially outside outer sleeve 27 as viewed in radial direction R. Inner ring 39 of release bearing 38 is disposed on outer sleeve 27 so as to be fixed against relative rotation, for instance pressed on. Inner ring 39 may likewise be an integral part of outer sleeve 27. Outer ring 40 of release bearing 38 is designed for rotation relative to inner ring 39 and is fixed against rotation relative to bearing sleeve 41. Bearing sleeve 41 may have one or two collar sections that at least partly cover one or both end faces of release bearing 38. In the illustrated exemplary embodiment, release bearing 38 is embodied as a single-row ball bearing, but it may likewise be a multi-row ball bearing, an angular contact ball bearing, a tapered roller bearing, a cylindrical roller bearing, or a journal bearing. Via outer sleeve 27, release bearing 38, and pull and push device 42 connected to release bearing 38 via bearing sleeve 41, slide device 26 acts on radially inward fingers 13 of lever element 12 as viewed in radial direction R to engage or disengage the clutch device. For this purpose, both pull and push forces may be transmitted.

Rolling body screw drive 28 is preferably disposed radially between rotor device 22 and slide device 26 as viewed in radial direction R. In the illustrated exemplary embodiment, formed spring 31 of rolling body screw drive 28 has fifteen coils, but basically any number of coils equal to or greater than three is possible.

In addition to formed spring 31, rolling body screw drive 28 has a rolling body revolution track with a rolling body channel 30 in which rolling bodies 29 are disposed, preferably over the entire circumference, in one row or, if desired, in multiple rows axially spaced apart from each other in axial direction A. Rolling body channel 30 may be a separate component connected to rotor device 22, in particular, to yoke 24, but it may also be an integral part of rotor device 22, in particular, yoke 24. Rolling body channel 30 is in particular formed in the outer circumference of rotor device 22 or of yoke 24 if the drive of actuating device 18 an external-rotor motor. If the drive of actuating device 18 is an internal-rotor motor, the reverse is the case, i.e., rolling body channel 30 of rolling body revolution track is advantageously disposed in the inner circumference of rotor device 22, in particular, of yoke 24.

Rolling bodies 29 run in grease-filled area 33, which is sealed in axial direction A by seals 34, 35, and are preferably designed as balls. However, it is likewise possible for rolling bodies 29 to be pins or to have a barrel or cask shape. In a manner corresponding to the outer contour of rolling bodies 29, formed spring 31 has an engagement contour which contacts surface regions of rolling bodies 29. The engagement contour essentially corresponds to the corresponding surface region of rolling body/bodies 29.

In the illustrated exemplary embodiment, the coils of formed spring 31 have two engagement contours that are spaced apart from each other in axial direction A and are separated by a ridge located therebetween. Thus, formed spring 31 is embodied as formed spring 31 with an inner contour as rolling bodies 29 run radially inside formed spring 31 as viewed in radial direction R. However, the reverse is likewise possible, i.e., formed spring 31 may be a formed spring with an outer contour if an internal-rotor motor is used.

Rolling body channel 30 of the rolling body track has a (non-illustrated) track changing region designed in such a way that before the track changing region as viewed in circumferential direction U, rolling bodies 29 run in rolling body channel 30 and axially between coil 32*a* and coil 32*b* of formed spring 31 as viewed in axial direction A and after the track changing region as viewed in the circumferential direction U, rolling bodies 29 run in rolling body channel 30 and axially between coil 32*b* and coil 32*c* of formed spring 31 as viewed in axial direction A. Thus, between coil 32*a* and coil 32*b* of formed spring 31, a first track is defined in circumferential direction U for rolling bodies 29 and between coil 32*b* and coil 32*c*, a second track is defined in circumferential direction U for rolling bodies 29. At this point, it is to be understood that coil 32*a*, coil 32*b*, and coil 32*c* represent three successive coils of formed spring 31 and may be formed at any desired location of formed spring 31.

Depending on the position of slide device 29, coil 32*b* crosses the track changing region when viewing actuating device 18 from the side. It is advantageous for coil 32*b* to cross the track changing region exclusively in the region of the greatest depth of rolling body channel 30 (the greatest depth to be determined in radial direction R). As rolling bodies 29 are preferably designed as balls, rolling body channel is preferably embodied as a revolving ball channel. In the track changing region, steps must be taken to ensure that rolling bodies 29, i.e., the balls, may pass underneath the ridge of coil 32*b* of formed spring 31 to change from the one track defined between coils 32*a*, 32*b* to the other track defined between coils 32*b*, 32*c*. In this context, it is advantageous for the maximum depth of the track changing region at the crossing of coil 32*b* of formed spring 31 to essentially correspond to the diameter of the balls. The maximum depth of the track changing region is preferably greater than the diameter of the balls in order for the balls to be able to be completely submerged in the ball channel to reliably avoid contact with the ridge of coil 32*b* of formed spring 31.

When actuating device 18 is in operation, a rotation of rotor device 22 due to a suitable supply of power to stator device 20 causes the rolling body revolution track or rather rolling body channel 30 to rotate about axis of rotation Z of clutch device 1. Inside rolling body screw drive 28, rolling bodies 29 run in the tracks between coils 32*a*, 32*b* of formed spring 31 and between coils 32*b*, 32*c* of formed spring 31, while rolling bodies 29 revolve in rolling body channel 30, causing the tracks to move in axial direction A and the rotary movement of rotor device 22 to be translated into a translatory movement of slide device 26 in which formed spring 31 is axially fixed. The translatory movement of slide device 26 may be used directly or indirectly to actuate clutch device 1. Due to its design, actuating device 18 is capable of transmitting both pull and push forces.

As rolling body screw drive 28 preferably is a self-locking drive, stator device 20 needs to be supplied with power only when the operating condition of clutch device 1 is to be changed. Power may be supplied in both directions of rotation of rotor device 22, with clutch device 1 being engaged in one direction of rotation and disengaged in the other direction of rotation. If stator device 20 co-rotates, other ways of supplying power are possible.

To be able to transmit both pull and push forces to fingers 13 of essentially annular lever element 12, pull and push device 42 has both essentially annular pull element 44 and essentially annular push element 44. Fingers 13 of lever element 12 are disposed axially between push element 43 and push element 44 as viewed in axial direction A. Push element 43 and pull element 44 are disposed in such a way that when actuating device 18 is actuated, fingers 13 of lever element 12 are engageable with push element 43 and pull element 44 in an alternating way and preferably not at the same time. For this purpose, push element 43 and pull element 44 are axially spaced apart from each other in axial direction A and connected to one another by screw-sleeve connections 46, preferably by a number of screw-sleeve connections 46 distributed in the circumferential direction. The connection is preferably detachable, in particular, detachable in a non-destructive way.

Pull and push device 42, or, to be more precise, push element 43 and pull element 44 are disposed axially between release bearing 38 and central flange 4 as viewed in axial direction A. Central flange 4 is disposed axially between pull and push device 42 and counterplate 10, as viewed in axial direction A or, to be more precise, between pull and push device 42 and actual pressure plate 7 without pressure plate tabs 8. As viewed in an axial direction A, pull element 44 is closer to central flange 4 than push element 43.

Pull and push device 42 has multiple recesses 45 distributed in circumferential direction U, through which lever element 12 is engageable with central flange 4 to prevent the second control point from being passed especially in force-based wear compensation device 14 as described above. To be more precise, pull element 44 has multiple recesses 45 distributed in circumferential direction U through which lever element 12 is engageable with central flange 4. These recesses 45 are disposed between screw-sleeve connections 46 in circumferential direction U, with the holes for screw-sleeve connections 46 indicated by corresponding reference numeral 46 in FIG. 3. Recesses 45 are preferably formed on the inner edge of annular pull element 44.

The exemplary embodiments described above relate to clutch device 1, in particular, a drive clutch for an internal combustion engine of a hybrid vehicle, comprising counterplate 10, pressure plate 7 displaceable to a limited extent in an axial direction to frictionally clamp clutch disc 11 between pressure plate 7 and counterplate 10, lever element 12 acting on pressure plate 7 to displace pressure plate 7 in axial direction A, central flange 4 at least partially disposed between pressure plate 7 and lever element 12 and having at least one opening for pressure plate 7 and/or lever element 12 to pass through, and wear compensation device 14 for automatically adapting to clutch wear, wherein to prevent any undesired wear compensation, lever element 12 is engageable with central flange 4.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE SYMBOLS

1 Clutch device
2 Housing component
3 Cover component
4 Central flange
5 Protruding section
6 Central bearing
7 Pressure plate
8 Pressure plate tab
9 Leaf spring
10 Counterplate
11 Clutch disc
12 Lever element
13 Finger
14 Wear compensation device
15 Sensor spring
16 Wire ring
17 Adjustment ring
18 Actuating device
19 Carrier component
20 Stator device
21 Power supply
22 Rotor device
23 Magnet
24 Yoke
25 Support bearing
26 Slide device
27 Outer sleeve
28 Rolling body screw drive
29 Rolling body
30 Rolling body channel
31 Formed spring
32a Coil
32b Coil
32c Coil
33 Grease chamber
34 Seal
35 Seal
36 Inner sleeve
37 Inner sleeve
38 Release bearing
39 Inner ring
40 Outer ring
41 Bearing sleeve
42 Pull and push device
43 Push element
44 Pull element
45 Recess
46 Screw-sleeve connection
A Axial direction
R Radial direction
U Circumferential direction
Z Axis of rotation

What is claimed is:

1. A clutch device for an internal combustion engine of a hybrid vehicle, comprising:
   a counterplate;
   a clutch disc including at least one friction lining;
   a pressure plate displaceable in a first axial direction to frictionally clamp the clutch disc between the pressure plate and the counterplate;
   a ring-shaped lever element including at least one finger, the ring-shaped lever element operatively arranged to displace the pressure plate in the first axial direction;
   a central flange including a protruding section, the central flange at least partially disposed between the pressure plate and the lever element and having at least one opening for the pressure plate to pass through;
   a wear compensation device for automatically compensating for clutch wear, including an adjustment ring arranged to rotate and displace in the first axial direction to contact the ring-shaped lever element when the thickness of the at least one friction lining decreases; and, an actuating device arranged to displace the ring-shaped lever element in the first axial direction and in a second axial direction opposite the first axial direction;

wherein, to prevent any undesired wear compensation, the protruding section is arranged to limit an axial displacement of the at least one finger in the first axial direction.

2. The clutch device recited in claim 1, wherein the actuating device comprises a stator device, a rotor device rotatable relative to the stator device, and a slide device that is displaceable in an axial direction relative to the rotor device, applies pull and push forces, and is in operative connection with a pull and push device applying pull and push forces onto the at least one finger.

3. The clutch device recited in claim 2, wherein the pull and push device has at least one recess through which the at least one finger is engageable with the protruding section.

4. The clutch device recited in claim 2, wherein the actuating device is supported for rotation on the central flange by a central bearing.

5. The clutch device recited in claim 2, wherein the pull and push device includes at least one pull element and at least one push element connectable to each other and wherein the at least one finger is receivable between the at least one pull element and the at least one push element.

6. The clutch device recited in claim 5, wherein the at least one pull element has at least one recess through which the at least one finger is engageable with the protruding section.

7. The clutch device recited in claim 5, wherein the at least one pull element and the at least one push element are detachably connected to each other.

8. The clutch device recited in claim 5, wherein the at least one pull element and the at least one push element are detachably connected by means of multiple screw-sleeve connections distributed in a circumferential direction.

9. The clutch device recited in claim 8, wherein the at least one pull element has multiple recesses distributed in the circumferential direction through which the lever element is engageable with the central flange and which are disposed between the multiple screw-sleeve connections.

10. The clutch device recited in claim 2, wherein a rolling body screw drive including at least three coils and a rolling body revolution track with rolling bodies running in a rolling body channel is provided between the rotor device and the slide device, wherein the rolling body channel has a track changing region designed in such a way that before the track changing region as viewed in a circumferential direction, rolling bodies run between a first coil and a second coil and behind the track changing region as viewed in the circumferential direction, rolling bodies run between the second coil and a third coil.

11. The clutch device recited in claim 1, wherein the actuating device comprises a stator device, a rotor device rotatable relative to the stator device, and a slide device that is displaceable in an axial direction relative to the rotor device, applies pull and push forces, and is in operative connection with a pull and push device applying pull and push forces onto the at least one finger.

* * * * *